Figure 1:
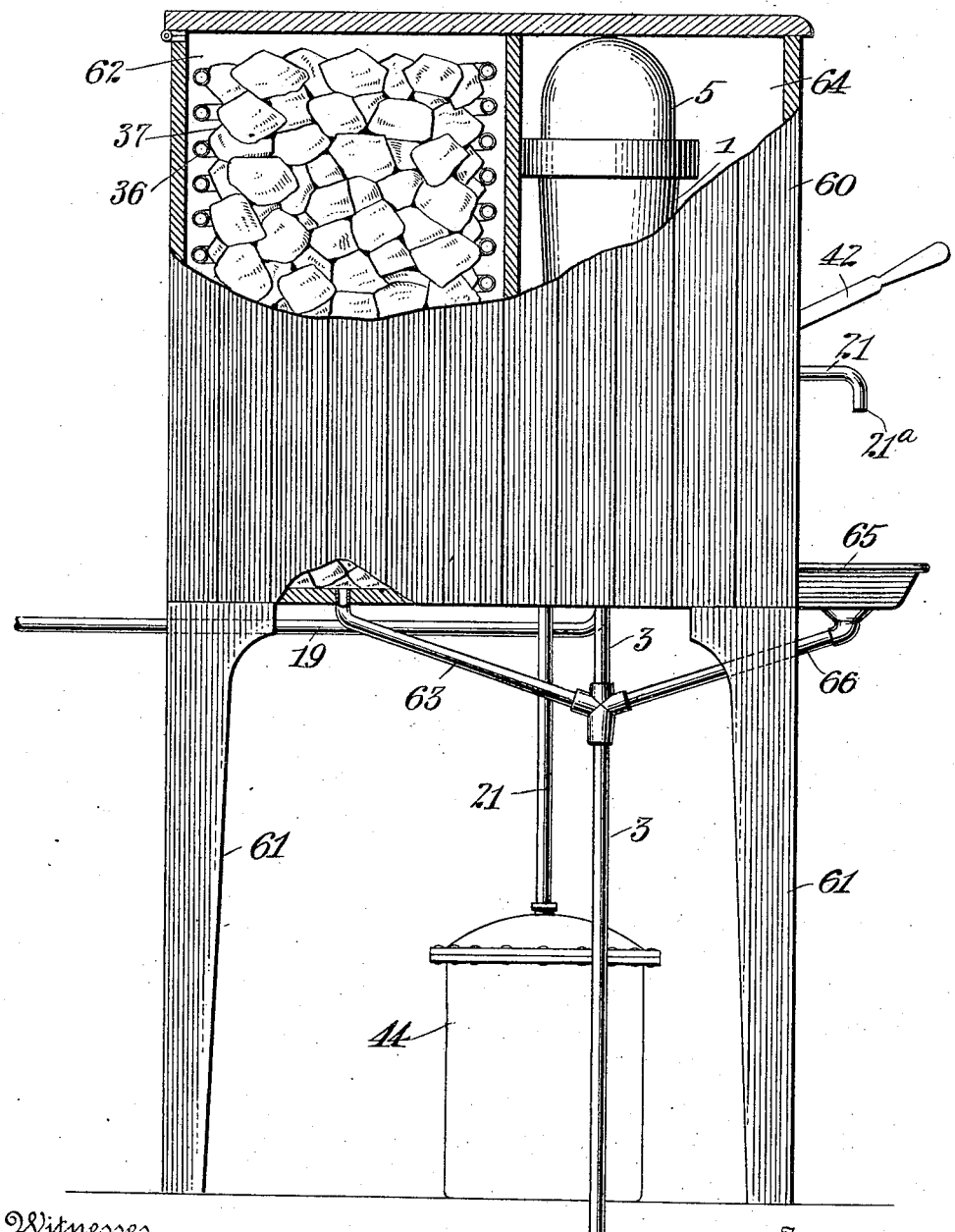

No. 880,558. PATENTED MAR. 3, 1908.
B. METCALF.
SELF CLEANSING FILTER.
APPLICATION FILED AUG. 19, 1905.

3 SHEETS—SHEET 1.

Witnesses
Inventor
Bryce Metcalf,
By his Attorney

No. 880,558. PATENTED MAR. 3, 1908.
B. METCALF.
SELF CLEANSING FILTER.
APPLICATION FILED AUG. 19, 1905.
3 SHEETS—SHEET 2.
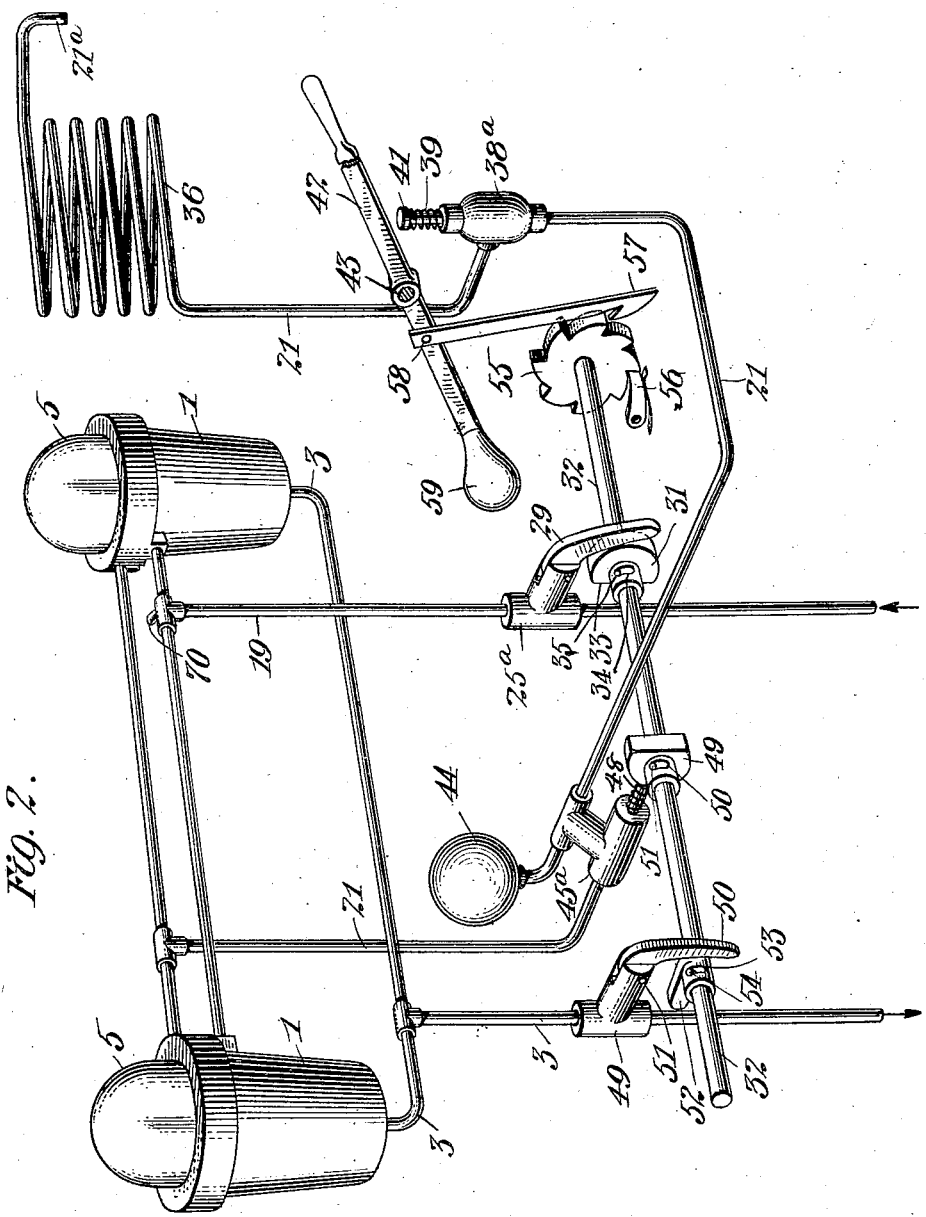

No. 880,558. PATENTED MAR. 3, 1908.
B. METCALF.
SELF CLEANSING FILTER.
APPLICATION FILED AUG. 19, 1905.
3 SHEETS—SHEET 3.
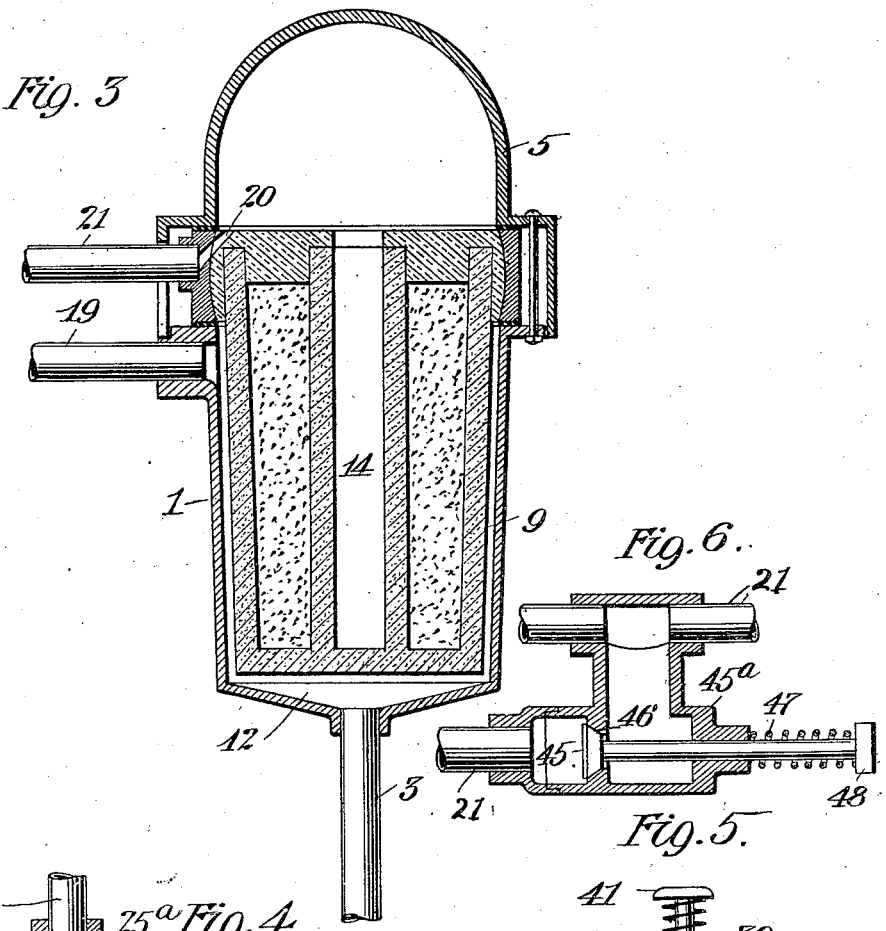
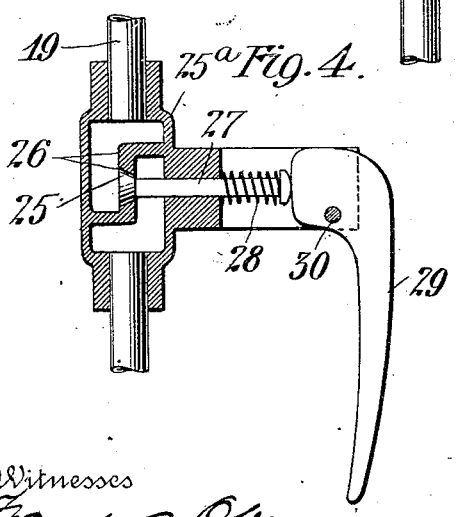
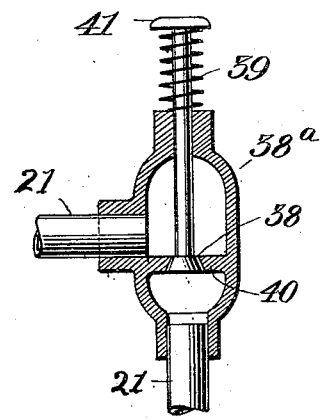
Witnesses
Inventor
Bryce Metcalf
By his Attorney

UNITED STATES PATENT OFFICE.

BRYCE METCALF, OF NEW YORK, N. Y.

SELF-CLEANSING FILTER.

No. 880,558.  Specification of Letters Patent.  Patented March 3, 1908.

Application filed August 19, 1905. Serial No. 274,890.

*To all whom it may concern:*

Be it known that I, BRYCE METCALF, a citizen of the United States, residing in the borough of Manhattan, New York city, county and State of New York, have invented certain new and useful Improvements in Self-Cleansing Filters, of which the following is such a full, clear, and exact description as will enable any one skilled in the art to which it appertains to make and use the same, reference being had to the accompanying drawings, forming part of this specification.

My invention relates to filters for purifying water and in which the filter medium or body is automatically cleansed by the water in the filter, such a general type of filter being found in U. S. Letters Patent No. 789,751, granted to me May 16th, 1905. In operating filters of this type, I have found that where small quantities of filtered water are drawn off, such for example as a glass of water, it is not only unnecessary to wash or cleanse the filter-medium after each operation of the filter, but that this frequent washing or cleansing wastes a considerable quantity of water.

The principal objects of my present invention are to provide a self-cleansing filter in which the cleansing action does not take place at each operation of the means for drawing off the filtered water, but occurs only after several, or a predetermined number of operations of such drawing-off means. For instance, instead of causing the filter to cleanse itself after it is operated to draw off one glass of water, I have so designed it that the cleansing operation takes place after the filter has been operated to draw off several different quantities of water.

With these and other objects in view, my invention consists in the various novel and peculiar arrangements and combinations of the several parts of the apparatus, all as hereinafter fully described and then pointed out in the claims.

I have illustrated a type of my invention in the accompanying drawings, wherein:—

Figure 1 is a side view of a self-cleansing filter and cooler embodying my invention, part of the casing being shown as broken away and in vertical section. Fig. 2 is a perspective view of the apparatus shown without the casing and the support thereof. Fig. 3 is a central vertical sectional view of the self-cleansing filter itself with its three pipe-connections. Figs. 4, 5 and 6 are central sectional views of the different valves contained in the apparatus.

Referring to the drawings, in which like numbers of reference designate like parts throughout, 1 is the exterior casing of the filter, substantially like that shown in my Letters Patent No. 789,751, to which reference may be had for a full and complete description thereof. The filter body or medium 9, is mounted within the casing 1, so that there is provided between the same and the casing an annular-chamber 12, which constitutes the unfiltered water chamber, the unfiltered water being supplied to the chamber 12, under pressure, through the pipe 19, while the filtered water is drawn off from the interior of the dome 5, by the drawing-off pipe 21, which communicates therewith through the passage 20.

In the operation of this type filter, the water being supplied under pressure through pipe 19, to the chamber 12, the water is forced thence through the filtering medium 9, and the filtered-water begins to rise in the dome 5, confining the air above it and placing such air under the pressure of the main, from which the water is supplied. Under this condition when the draw-off pipe 21 is opened the filtered water will pass from the dome 5, under pressure of the air above it. Upon closing the draw-off pipe 21, likewise the supply pipe 19, and immediately opening the waste-pipe 3, the filtered water remaining in the dome is then forced back through the filter-medium 9, over the reverse course over which it has previously passed in being filtered, and under pressure of the air in the dome and this back-wash cleanses the filter and passes thence out of the waste 3. The operation just described is that found in my present invention, however, I do not open the waste-pipe after each filtering or drawing off operation, but only open the waste for the purpose of cleansing the filter, periodically, and after several operations of the drawing-off means.

In the construction herewith shown, two filters are illustrated but the system applies to one filter, or to more than two, equally well and in describing the construction and operation of the apparatus only one filter need be considered. The supply pipe 19, which may be connected with an ordinary water-main, is provided with a valve 25 having a valve seat 26 and provided with a valve-stem 27, having a spring 28 for normally keeping the valve closed on its seat. The valve stem is acted upon by a lever or trip 29, pivoted at 30 to a projection on the valve casing 25ª, and this lever is in turn operated by a cam 31 which is mounted on a shaft 32, the cam having a low-part 33, which is of such proportion to the high-part of the cam, as to allow the supply valve 25 to remain closed only for a short time. This cam 31 is mounted on its shaft so as to turn therewith, at the same time having a slight rotary play on the shaft, by means of a slot 34 in the hub of the cam and a fixed pin 35 on the shaft. As this cam 31 is designed to keep the supply valve 25 open the greater part of the time and a quick closing of the valve is desirable, (as will be understood from the description of the remaining parts of the apparatus) I therefore, construct this cam with this lost motion on its shaft, whereby the cam-lever 29, under action of spring 28 of the valve, may snap the cam around and allow the supply valve to be quickly closed by its spring.

The drawing-off pipe 21 is provided near its outlet 21ª, with a coil 36, which is used for the purpose of cooling the contents of the pipe by ice which is indicated at 37, in Fig. 1. A valve 38 is located in the drawing-off pipe and is normally kept closed by a spring 39 on its valve seat 40, the stem 41 of this valve being engaged by a hand-operated lever 42, which is pivoted at 43 to a suitable fixed point, so that at each depression of lever 42 the draw-off valve 38, is opened.

In this type of filter, in which the filter body is cleansed by a back-wash of the filtered water which receives the pressure from the air confined in the dome, the initial filtering operation is somewhat slow, so that upon opening the drawing-off faucet the filtered water does not immediately begin to flow therefrom, for the obvious reason that it takes a few moments for the filtered water to accumulate in the dome. While this is not particularly objectionable it is, nevertheless not a desirable feature to have in a filter, and I have entirely overcome this, and do so by locating at a suitable point in the draw-off pipe connections, a storage chamber or pressure reservoir 44, in which the filtered water may accumulate and be stored during the time the draw-off valve or faucet is closed so that immediately upon opening the draw-off valve there is a copious supply of filtered water under full pressure, from the outlet 21ª. Between this storage and pressure chamber 44 and the filter itself, there is located a valve 45, having a casing 45ª, and which is normally kept closed on its seat 46 by a spring 47, and the stem 48 of this valve is pushed upon by a cam 49, also mounted on the cam-shaft 32, and having a slight lost motion by means of a slot 50, in the cam-hub and a fixed pin 51, on the shaft. The cam 49 is substantially of the same construction as the cam 31 controlling the supply-valve 25, in respect to the proportion between the high and low parts of the cam, and this cam is likewise mounted so as to be snapped quickly around and permit the valve 45 to be closed quickly on its seat at the proper moment.

The waste pipe 3, leading from the filter is provided with a valve 49, which is the same as valve 25, which controls the supply-pipe, and this valve is likewise provided with a cam-lever 50 pivoted at 51 and acting to control the valve 49 in the same way as the cam-lever 29, controls its valve 25, though at a different time. The cam-lever 50, controlling the waste valve, is operated by a cam 52, mounted on the cam shaft 32 and having a slight lost motion thereon by means of a slot 53 on the hub of the cam and a fixed pin 54 on the shaft, so as to permit this cam to snap around and allow the valve 49 to be quickly closed at the proper time. This waste valve cam 52 has comparatively small high-part for the reason that this cam is intended to keep the waste valve open but a comparatively short time and that occurs but once during every revolution of the cam shaft 32.

The cam shaft 32 is operated by a step-by-step mechanism which in turn is actuated by the hand-operated lever 42 of the draw-off means. This step-by-step mechanism comprises a ratchet wheel 55, which is here shown as having eight teeth. This wheel 55 is fixed on the cam-shaft 32, so as to turn the shaft and a spring dog 56 engages the teeth of the ratchet to prevent backward rotation. The ratchet-wheel 55 is engaged by a pawl 57 which is pivoted at 58 to the hand-lever 42, and the lever is provided at a suitable point with a weight 59 which serves to normally keep the lever off the valve stem 41 of the draw-off valve and to hold the pawl 57 in position to engage a tooth on the ratchet whenever the lever is depressed to open the draw-off valve 38.

The various parts of the apparatus are so related and adjusted that the waste-valve 49 cannot be opened while either supply-valve 25, or the auxiliary valve 45 is open and so that both of the last mentioned valves may simultaneously be open while the waste-valve is closed. Considering now the various cams in the relative positions shown in Fig. 2, the draw-off valve 38 is closed, the supply valve 25 is open, likewise the auxiliary valve 45, while the waste valve 49 is closed. This condition permits the filtered water to rise to the highest point in the dome 5, and compress the air therein and then to flow from the dome 5 through the filtered water pipe 21 by way of the open valve 45 to the storage-chamber 44, which is likewise filled to its highest point and with the air under pressure therein the draw-off pipe 21 is also filled with filtered water down as far as the valve 38. Upon depressing the hand lever 42 and opening the valve 38 the filtered water may be drawn off from the outlet 21ª and this same operation of the lever turns the ratchet wheel 55 one tooth, thereby turning the cam-shaft one eighth of a revolution and moving the three cams on the shaft accordingly. Upon releasing the hand lever 42 the valve 38 is closed and the apparatus reset for the next following operation thereof in drawing off filtered water. The apparatus may be operated in the way just described a number of times without the waste valve being opened and with the supply and auxiliary valves maintained open. When, however, the cam shaft has been turned so that the cam 52 is brought into position to operate the cam lever 50, on the next depression of the hand-lever 42, the cam of both the supply and auxiliary valves stand ready to close their respective valves immediately upon the waste valve being opened on the next operation of the hand lever.

In the operation of the hand lever in drawing off filtered water, when the waste valve is opened and the other valves closed, the filtered water then drawn off is obtained from the storage chamber 44, as the auxiliary valve 45, is at that time closed and the filtering operation is for the time being, suspended. Upon the next succeeding operation of the hand-lever 42, in drawing off the filtered water, the three valves remain in the same positions thereby giving ample time for the cleansing process to take place, it being immaterial how long the waste valve remains open for the cleansing process, since the only water which can then pass from the filter being the quantity of filtered water remaining in the dome for the back-wash. Upon the next succeeding operation of the hand lever, the waste-valve is quickly closed and the supply and auxiliary valves are at once opened. It will thus be seen that at each operation of the hand-lever, the drawing off valve 38 is opened and filtered water is discharged from the outlet 21ª, but that the cleansing process does not occur but once during each revolution of the cam-shaft 32, such revolution being completed, in the construction herewith shown, by eight operations of the hand-lever, so that the cleansing only takes place once out of eight times that the filter is operated. This predetermined number of operations of the filter before cleansing it may be varied as desired and to suit the particular conditions.

In actual practice I have found that the present construction is a good one and that the filter body is kept thoroughly cleaned by cleansing it once out of eight operations of the drawing off means.

At a suitable point in the supply pipe 19, I provide an air valve 70, by means of which the outer air is admitted to the supply in order to eventually replace the air in the dome 5, which escapes therefrom during the back-wash when the filter is cleansed. A full description of the construction and operation of a similar air valve is found in my said Letters Patent No. 789,751.

In Fig. 1, I show a constructon of a combined filter and water cooling apparatus which is provided with a casing 60, having supports or legs 61, for elevating the apparatus to the proper height, the casing containing a compartment 62 for the pipe coil 36 and the ice 37, with a drain-pipe 63 extending from the bottom of the compartment to the waste pipe 3. The filter 1—5, is placed in a compartment 64 within the casing 60, likewise the various valves and cams for actuating the same, the hand-lever 42 projecting from the front of the casing in a position to be easily handled by a person, likewise the outlet 21ª of the drawing off pipe 21; a drip-receptacle 65 beng placed beneath the outlet and connected with the waste 3 by pipe 66. In this form of apparatus the storage pressure chamber 44 is shown as of considerable size and placed beneath the casing 60 with the drawing off pipe 21 leading into the top of the chamber, the action of which is the same as that already described in Fig. 2.

I wish to be understood as not limiting my invention to the specific forms of the various different parts thereof as herewith set forth, as various modifications may be made in the different parts thereof without, however, departing from the spirit of my invention.

Having thus described my invention what I claim and desire to secure by Letters Patent is:

1. A self-cleansing filter having unfiltered water supplied thereto under pressure and provided with means for drawing off the filtered water, a step-by-step operated mechanism for automatically causing a back-wash of filtered water through the filter-body, such mechanism being operated after several operations of the said drawing-off means.

2. A self-cleansing filter having unfiltered water supplied thereto under pressure and provided with means for drawing off the filtered water, mechanism for automatically causing a back-wash of filtered water through the filter-body, such mechanism being operatively connected with and controlled by said drawing-off means and being actuated after several successive operations of said drawing-off means.

3. A self-cleansing filter having unfiltered water supplied thereto under pressure and provided with means for drawing off the filtered water, means for automatically confining air within the filter under the said pressure of the water therein, mechanism for causing a back-wash of filtered water through the filter-body under the pressure of the air thus confined in the filter to cleanse the filter, and such mechanism being operated after several operations of said drawing-off means.

4. A self-cleansing filter provided with means for drawing off the filtered water and having unfiltered water supplied thereto under pressure, means for confining air within the filter under the said pressure of the water therein, mechanism for forcing filtered water through the filter body under the pressure of such air to cleanse the filter and such mechanism being operated after several operations of said drawing off means, substantially as and for the purpose set forth.

5. A self-cleansing filter provided with means for drawing off the filtered water, and mechanism for cleansing the filter with the water therein, a step-by-step device intermediate between said drawing off means and the mechanism for cleansing the filter and said step-by-step device being actuated by each operation of said drawing off means but actuating said cleansing mechanism after several step-by-step movements of said device, substantially as and for the purpose set forth.

6. A self-cleansing filter having pipe connections provided with a valve for controlling the same for drawing off the filtered water, a waste outlet for carrying off the waste water from the cleansing of the filter and provided with a valve controlling the same, connections between the two said valves of the drawing off pipe and the waste, and means for operating the same by hand whereby at each operation thereof the said valve of the drawing off pipe may be open while the valve of said waste remains closed until after several operations of said drawing off means, substantially as and for the purpose set forth.

7. A self-cleansing filter provided with a supply pipe having a valve controlling the same, a waste-outlet also provided with a valve controlling the same, pipe connections for drawing off the filtered water and provided with a valve controlling such action, and means for actuating the valve of said drawing off pipe connection in drawing off the filtered water, such means being connected with and controlling said supply and waste valve and opening said supply valve at each operation of the drawing off valve but actuating said waste valve periodically for cleansing the filter, substantially as and for the purpose set forth.

8. A self-cleansing filter having an unfiltered water chamber provided with a water supply, a filtered water chamber provided with valved means for drawing the water therefrom, a filtering medium, means for confining the air above the filtered water under pressure of said water, the water being supplied to the unfiltered water chamber more rapidly than the water is drawn off from the filtered water chamber, the said drawing off means being provided with a storage pressure chamber and an auxiliary valve located between the said filter and the storage chamber and means for periodically operating it during the successive operations of the valve of said drawing off means, substantially as and for the purpose set forth.

In testimony whereof, I have hereunto set my hand in the presence of the two subscribing witnesses.

BRYCE METCALF.

Witnesses:
WILLIS FOWLER,
WILLIAM A. STEIN.